March 13, 1934.  G. W. BEHLER  1,950,589
SEMITRAILER
Filed April 3, 1933
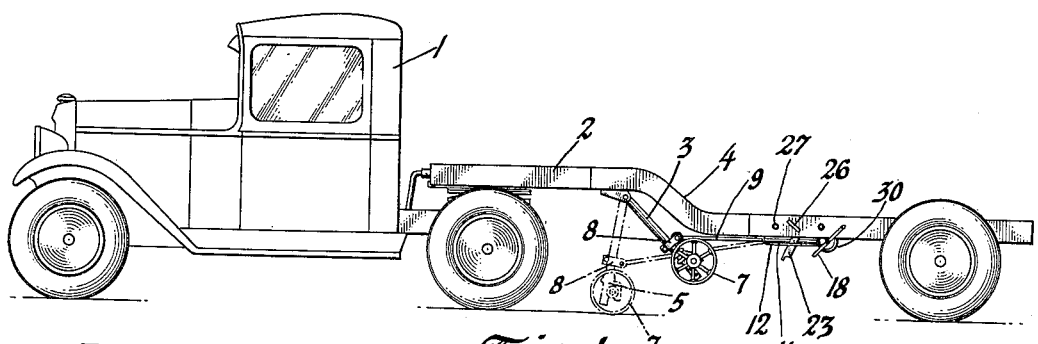
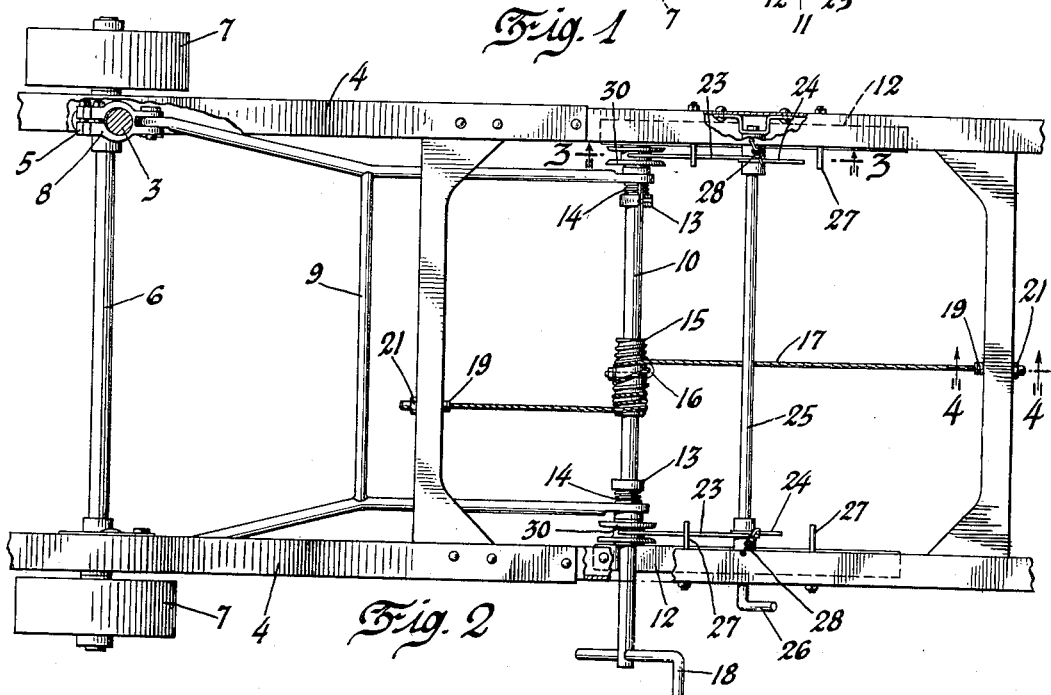
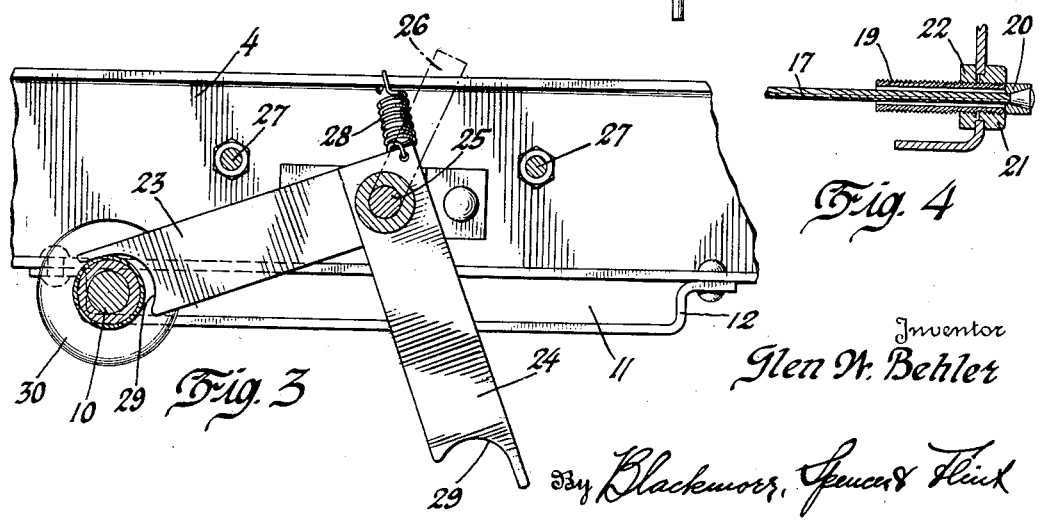
Inventor
Glen W. Behler
By Blackmore, Spencer & Flint
Attorneys Patented Mar. 13, 1934

1,950,589

UNITED STATES PATENT OFFICE 1,950,589

SEMITRAILER

Glen W. Behler, Pontiac, Mich., assignor to Yellow Truck & Coach Manufacturing Company, Pontiac, Mich., a corporation of Maine Application April 3, 1933, Serial No. 664,130

13 Claims. (Cl. 280—33.1)

This invention relates to motor vehicles, and more particularly to an improved operating mechanism for the retractible supports of semitrailers.

It is an object of the invention to provide a dependable construction which will be easy and economical to manufacture from a relatively few and readily obtainable parts, and which will be simple to operate and unlikely to get out of order.

The invention will be best understood by reference to the accompanying drawing, wherein Figure 1 is a side elevation of a tractor-trailer combination, in which the present invention is embodied. Figure 2 is a top plan view of a fragment of the trailer frame showing the landing gear. Figure 3 is a side elevation of the latching mechanism for holding the landing gear in adjusted position with certain parts in section, as on line 3—3 of Figure 2, and Figure 4 is a detail sectional view on line 4—4 of Figure 2.

Referring to the drawing, the reference numeral 1 indicates a four-wheeled truck or tractor, supporting through a suitable fifth wheel the front end of a two-wheeled trailer 2, which may be provided with a conventional load supporting platform or body. For supporting the front end of the semi-trailer 2 when uncoupled from the tractor, it is customary to provide a retractible support or prop.

In Figure 1 of the drawing, a form of supporting prop, which has been found to be satisfactory, is shown in full lines in its elevated position, and in broken lines in its lowered or supporting position. It consists of a pair of swinging posts 3 pivotally mounted at their upper ends in suitable brackets on the underside of the longitudinally extending and transversely spaced trailer frame members 4—4. Adjacent their lower ends the bars 3 are provided with adjustable brackets 5 for carrying a transverse axle 6 on the opposite ends of which are mounted ground engaging wheels 7—7.

Each bar 3 is also provided with a bracket 8 forming a pivotal connection for the forward end of an adjacent leg of an H-shaped drag bar or motion transmitting connection 9 extending rearwardly from the swinging prop. At their rear ends the two legs of the tie connection 9 are apertured to receive a transversely extending rotatable shaft 10 forming a part of the landing gear assembly, and mounted at opposite ends in elongated openings 11, formed by U-shaped brackets or retainers 12 riveted or otherwise secured on the underside of the frame member 4. Adjacent each apertured leg of the tie connection 9, the shaft 10 carries a fixed collar or spacer 13, between which and the tie may be inserted a coil spring 14 to eliminate looseness or rattle of the parts.

At an intermediate point, the shaft 10 carries a sleeve or drum 15 anchored thereto by a suitable stud 16, which stud also secures to the drum an intermediate looped portion of a flexible wire or cable 17, whose opposite ends are anchored or fixed to the trailer. To each side of the stud 16, the sleeve 15 is provided with a helical groove or way, in which the cable may be wound when the shaft 10 is rotated by means of the handle 18 at one end thereof. To take up slack in the cable and maintain the same taut, each end connection may involve, as shown in Figure 4, a threaded tube 19 bearing on an enlarged head or terminal 20 of the cable and extending through an opening in a transverse member of the trailer frame on opposite sides of which are located the lock nuts 21 and 22, adjustably threaded on the sleeve 19.

It will be apparent that the rotation of the shaft 10, by means of the handle 18, will unwind the cable to one side and wind the cable on the other side, which action will shift the shaft bodily in the bearing slots 11 with the movement being transmitted through the connection 9 to the swinging props 3 to either raise or lower the ground wheels 7, depending on the direction of rotation of the hand lever 18.

To hold the landing gear in adjusted position, latch mechanism is provided in the form of two pairs of angularly related arms 23 and 24, respectively, fixedly mounted adjacent each frame member 4 on a rock shaft 25, having an operating handle 26. The rock shaft 25 is mounted in suitable bearings at a point intermediate the opposite ends of the bracket 12, which defines the extreme limits of movement permitted the shiftable member 10 of the landing gear assembly. Suitable stop pins 27, carried by each frame member are provided to limit the extent of rocking movement of the latch levers, and a contractile spring 28 is fastened at one end to the frame and at its opposite end in an off center relation with the angularly related arms 23 and 24.

Each of these arms is provided near its end with a notched seat 29, and is of such length that the seat engages with the shiftable member to hold it in an extreme position. To receive the notched ends and serve as a guide for the angularly related lever arms 23 and 24, which are in effect a fork that straddles the shaft 10, a spool or guide roller 30 is carried at each end of the shaft and provided with side flanges of sufficient size as to extend on opposite sides of the forked lever at any position to which it may be moved.

The position of the parts shown in Figure 3 is that taken when the landing gear is in its load supporting position. After the tractor has been coupled to the semi-trailer and it is desired to retract the ground wheels, the operator manually rocks the handle 26 to turn the shaft 25 and lift each arm 23 upwardly against the tension of the spring 28 into engagement with the stop pin 27 and out of the path of the shaft 10, until the shaft is shifted beyond the seat 29 by the actuation of the handle 18. Continued rotation of the shaft 10 causes it to move in the slide 12 until it reaches the opposite limit and seats within the notch 29 on the lever 24 after having rocked the lever against the action of the centering spring 28. The reverse procedure is followed in lowering the supports.

I claim:

1. The combination with a semi-trailer and a supporting prop therefor, of operating mechanism for the prop, including a transverse shaft operatively connected with the prop and mounted for rotatable and shifting movements, means to shift said shaft upon its rotation for raising or lowering the prop, and manually controlled means independent of said shifting means, for holding the shaft in shifted position.

2. The combination with a semi-trailer and a supporting prop therefor, of operating mechanism for the prop, including a shiftably mounted drum connected with the prop, and a cable windable on the drum to shift the same upon drum rotation.

3. A semi-trailer having a retractible support, a rotatable member movable with said support, and a cable having its opposite ends anchored at spaced points to the trailer and its intermediate portion wound around said member so as to shift the member upon its rotation.

4. In a semi-trailer, a retractible support pivoted for swinging movement toward and from supporting position, a rotatable shaft shiftably mounted and arranged in parallel relation to the pivot axis of the support, a drag link between said support and shaft, and an anchored cable windable upon said shaft so as to swing the support upon shaft rotation.

5. In a semi-trailer, a retractible support, a rotatable member shiftably mounted for movement with the support, an anchored cable windable upon rotation of the member for shifting the same, and manually controlled means for holding said member in a shifted position and including a rockable device having a pair of angularly related arms movable into and out of the path of said member and of such length that the member is held by one arm at one limit and by the other arm at the other limit of shifting movement.

6. In a semi-trailer, a retractible support, a shiftable member associated therewith, a pair of angularly related arms straddling said member and pivotally mounted for swinging movement about a point intermediate the opposite limits of shifting movement of said member, and means associated with the respective arms for latching engagement with the member in its extreme positions.

7. In a semi-trailer, a swinging prop, a transversely extending rotatable shaft, motion transmitting connections between the prop and shaft engaging the shaft at transversely spaced points, means for mounting said shaft adjacent said connections for shifting movement toward and from the prop, a flexible cable anchored at opposite ends and looped around said shaft so as to be wound thereon to shift the same upon shaft rotation, a pair of transversely spaced and interconnected levers pivotally mounted intermediate the opposite limits of shifting movement of the shaft, and guide rollers on the shaft receiving said levers and adapted to seat in notched ends of the levers at limits of shaft movement.

8. A semi-trailer having a retractible prop, operating means therefor, including a shiftable member movable with the prop, a forked lever straddling said member and having seats to engage and lock said member at spaced apart points in its path of travel and means to resiliently urge the lever toward locking position.

9. A semi-trailer having a retractible prop, operating means therefor, including a shiftable member movable with the prop, a forked lever straddling said member and having seats to engage and lock said member at spaced apart points in its path of travel and an over center spring to resiliently maintain the respective seats in engagement with the member.

10. A semi-trailer having a retractible prop, operating means therefor, including a shiftable member movable with the prop, a latch element, a pivotal mounting for the latch element, and a pair of seats associated with said latch element on opposite sides of its pivotal mounting for latching engagement with said shiftable member.

11. A semi-trailer having a retractible prop, operating means therefor, including a shiftable member movable with the prop, and a pivoted fork straddling said member and having seats on opposite sides of its pivot for latching engagement with said member in spaced apart positions thereof.

12. In a semi-trailer having a retractible support, operating mechanism for raising and lowering the support, including a rotatable member, means mounting said member on the trailer for relative shifting movement, a flexible cable fixed relative to the trailer by anchorage connections at its opposite ends and provided with an intermediate loop wrapped around said member, means for rotating said member to effect a shifting thereof in its mounting through a change in the wrapping of the cable between the anchored ends and a drag bar for connecting said member with the trailer support.

13. In a semi-trailer, the combination with a trailer frame and a supporting prop movably mounted on the frame, of operating mechanism for raising and lowering said prop, including a rotatable member, means mounting the member on the frame for relative shifting movement, means fixedly carried by the frame and engaged by said member to cause the member to shift its position in the mountnig means upon rotation, and means for transmitting motion between the member and the prop.

GLEN W. BEHLER.